United States Patent
Gao et al.

(10) Patent No.: US 11,811,315 B2
(45) Date of Patent: Nov. 7, 2023

(54) DC/DC CONVERSION CIRCUIT

(71) Applicant: Huawei Digital Power Technologies, Co., Ltd., Shenzhen (CN)

(72) Inventors: Yongbing Gao, Shanghai (CN); Jun Wang, Shanghai (CN); Lei Shi, Shanghai (CN)

(73) Assignee: HUAWEI DIGITIAL POWER TECHNOLOGIES CO., LTD., Shenzhen (CN)

( * ) Notice: Subject to any disclaimer, the term of this patent is extended or adjusted under 35 U.S.C. 154(b) by 301 days.

(21) Appl. No.: 17/350,191

(22) Filed: Jun. 17, 2021

(65) Prior Publication Data

US 2021/0313880 A1 Oct. 7, 2021

Related U.S. Application Data

(63) Continuation of application No. PCT/CN2019/121009, filed on Nov. 26, 2019.

(30) Foreign Application Priority Data

Dec. 18, 2018 (CN) .......................... 201811546964.0

(51) Int. Cl.
*H02M 3/155* (2006.01)
*H02H 7/12* (2006.01)
(Continued)

(52) U.S. Cl.
CPC .......... *H02M 3/155* (2013.01); *H02H 7/1213* (2013.01); *H02M 1/44* (2013.01); *H02M 7/537* (2013.01); *H04B 1/40* (2013.01)

(58) Field of Classification Search
CPC ........ H02M 3/155; H02M 1/44; H02M 7/537; H02H 7/1213; H04B 1/40
(Continued)

(56) References Cited

U.S. PATENT DOCUMENTS

| 6,043,965 A | * | 3/2000 | Hazelton | ............ | H02H 11/003 361/84 |
| 2001/0024108 A1 | * | 9/2001 | Tamura | ............ | H02H 11/002 323/224 |

(Continued)

FOREIGN PATENT DOCUMENTS

| CN | 201994659 U | 9/2011 |
| CN | 102496923 A | 6/2012 |

(Continued)

*Primary Examiner* — Yemane Mehari
(74) *Attorney, Agent, or Firm* — Conley Rose, P.C.

(57) ABSTRACT

A direct current (DC)/DC conversion circuit includes an input end, a power circuit, and an output end, a bypass circuit that is a unidirectional conduction circuit, and a switch disposed between the input end and the power circuit, where the input end is configured to be coupled to an external power supply to receive power to the DC/DC conversion circuit. The bypass circuit is coupled between the input end and the power circuit, the bypass circuit is disposed between the switch and the power circuit, and the bypass circuit is coupled to the power circuit in parallel. The switch is configured to be closed when the input end is reversely coupled to the external power supply to enable a current from a positive electrode of the external power supply to flow back to a negative electrode of the external power supply through the bypass circuit and the switch.

20 Claims, 8 Drawing Sheets

(51) Int. Cl.
*H02M 1/44* (2007.01)
*H02M 7/537* (2006.01)
*H04B 1/40* (2015.01)

(58) Field of Classification Search
USPC ........................................................ 363/131
See application file for complete search history.

(56) References Cited

U.S. PATENT DOCUMENTS

2007/0268048 A1* 11/2007 Komatsu ............ H03K 17/0822
327/143
2013/0193754 A1   8/2013 Sugiyama et al.

FOREIGN PATENT DOCUMENTS

CN      206149209 U    5/2017
CN      206272229 U    6/2017

* cited by examiner

DC/DC CONVERSION CIRCUIT

CROSS-REFERENCE TO RELATED APPLICATIONS

This application is a continuation of International Patent Application No. PCT/CN2019/121009 filed on Nov. 26, 2019, which claims priority to Chinese Patent Application No. 201811546964.0 filed on Dec. 18, 2018. The disclosures of the aforementioned applications are hereby incorporated by reference in their entireties.

TECHNICAL FIELD

This application relates to the field of power electronics technologies, and in particular, to a direct current (DC)/DC conversion circuit.

BACKGROUND

In various power electronic converters, when an input power supply is reversely connected, another component of a circuit may be damaged if there is no protective measure. A DC-DC conversion circuit (or DC/DC circuit) is a circuit that boosts or bucks a direct current. An input and an output of the circuit each are a direct current. The DC/DC circuit is widely applied to fields such as an energy storage field, an electric vehicle field, a new energy field, a power system field, an electronic computer field. A boost power conversion circuit is used as an example. As shown in FIG. 1, after an input power supply Udc is reversely connected, the input power supply Udc is short-circuited with a parasitic diode D1 of a switching transistor T (an insulated-gate bipolar transistor (IGBT) or a metal-oxide-semiconductor field-effect transistor (MOSFET)) and a power inductor L. Because a through-current capability of a parasitic diode D1 of a switch component is usually relatively low, excessive short-circuit currents may cause the switch component to be burnt out.

In the other approaches, as shown in FIG. 2, a silicon (Si) diode D3 with a high through-current capability is connected to a power switching transistor T in parallel. As shown in the following figure, when an input power supply is reversely connected, a short-circuit current passes through the protection diode D3, to protect the power switching transistor.

In the other approaches, the Si diode D3 with a high through-current capability is connected to the power switching transistor T in parallel, to protect the power switching transistor. However, because a large-capacity Si diode has relatively large parasitic junction capacitance, a junction capacitor is connected to two sides of the switching transistor in parallel, to equivalently increase junction capacitance of the switching transistor, thereby reducing a switching speed of a power device. Considering that boost is a hard switching circuit, reducing the switching speed increases a switching loss of the power transistor and reduces circuit efficiency.

Therefore, how to eliminate, without an increase in the loss, the impact that is on the switch component and that is exerted when the input power supply Udc is reversely connected is an urgent problem to be resolved.

SUMMARY

An embodiment of this application provides a DC/DC conversion circuit. A switch is disposed between an input end of the DC/DC conversion circuit and a power circuit in the DC/DC conversion circuit, and a diode is disposed between the switch and the power circuit. In this way, a problem that a circuit loss is relatively large when the input end of the DC/DC conversion circuit is reversely connected to an external power supply is resolved, to reduce a loss of the DC/DC conversion circuit when the input end is reversely connected to the external power supply.

According to a first aspect, an embodiment of this application provides a DC/DC conversion circuit, including an input end, a power circuit, and an output end, and further including a bypass circuit, where the bypass circuit is a unidirectional conduction circuit, a switch S is disposed between the input end and the power circuit, the input end is configured to be connected to one or more external power supplies, and the external power supply is configured to supply power to the DC/DC conversion circuit, the bypass circuit is connected between the input end and the power circuit, the bypass circuit is disposed between the switch S and the power circuit, and the bypass circuit is connected to the power circuit in parallel, and the switch S is configured to be closed when the input end is reversely connected to the external power supply, so that a current output by a positive electrode of the external power supply flows back to a negative electrode of the external power supply through the bypass circuit and the switch S.

Beneficial effects of this embodiment of this application provides a photovoltaic inverter, including the foregoing DC/DC conversion circuit. The switch is disposed between the input end of the DC/DC conversion circuit and the power circuit in the DC/DC conversion circuit, and the bypass circuit is disposed between the switch and the power circuit. The bypass circuit is a unidirectional conduction circuit. In this way, a problem that a circuit loss is relatively large when an input end of a DC/DC conversion circuit is reversely connected to an external power supply is resolved, to reduce a loss of the DC/DC conversion circuit when the input end is reversely connected to the external power supply.

In a possible design, the DC/DC conversion circuit further includes a controller, where the controller is connected to the switch S, and the controller is configured to detect a current or a voltage at an output end of the external power supply, to determine whether the input end is reversely connected to the external power supply, and the controller is further configured to when determining that the input end is reversely connected to the external power supply, control the switch S to be opened.

The current or the voltage at the output end of the external power supply is detected. Further, a direction of the current or the voltage is detected. In this way, it can be determined whether the output end of the external power supply is a positive electrode or a negative electrode, to determine whether the external power supply is reversely connected to the input end of the DC/DC conversion circuit.

In a possible design, the bypass circuit in the DC/DC conversion circuit includes a diode D, and that the external power supply is reversely connected includes a case in which an anode of the diode D is connected to the positive electrode of the external power supply.

The bypass circuit is set to including the diode D, so that the bypass circuit is a unidirectional conduction circuit.

In a possible design, in the DC/DC conversion circuit, that the external power supply is reversely connected includes that the anode of the diode D is connected to the positive electrode of the external power supply through the switch S.

In a possible design, in the DC/DC conversion circuit, when the input end is positively connected to the external power supply, the anode of the diode D is connected to the negative electrode of the external power supply, or the anode of the diode D is connected to the negative electrode of the external power supply through the switch S.

In a possible design, in the DC/DC conversion circuit, the switch S is further configured to be closed when the input end is positively connected to the external power supply, so that the current output by the external power supply flows back to the negative electrode of the external power supply through the switch S and the power circuit.

In a possible design, in the DC/DC conversion circuit, the one or more external power supplies are a plurality of external power supplies, and the plurality of external power supplies are disposed in parallel.

In a possible design, in the DC/DC conversion circuit, the power circuit includes a forward boost circuit, a reverse boost circuit, a buck-boost circuit, a Cuk circuit, a single-ended primary-inductor converter (SEPIC) circuit, a Zeta circuit, or a bidirectional buck/boost circuit.

In a possible design, in the DC/DC conversion circuit, the switch S includes a relay, a contactor, a semiconductor bidirectional switch, or a mechanical switch.

According to a second aspect, an embodiment of this application provides a method for controlling a DC/DC conversion circuit. The DC/DC conversion circuit includes an input end, a power circuit, and an output end, and further includes a bypass circuit, the bypass circuit is a unidirectional conduction circuit, a switch S is disposed between the input end and the power circuit, the input end is configured to be connected to an external power supply, the external power supply is configured to supply power to the DC/DC conversion circuit, the bypass circuit is connected between the input end and the power circuit, the diode is disposed between the switch S and the power circuit, and the bypass circuit is connected to the power circuit in parallel. The method includes controlling the switch S to be closed when the input end is reversely connected to the external power supply, so that a current output by a positive electrode of the external power supply flows back to a negative electrode of the external power supply through the bypass circuit and the switch S.

This embodiment of this application provides a photovoltaic inverter, including the foregoing DC/DC conversion circuit. The switch is disposed between the input end of the DC/DC conversion circuit and the power circuit in the DC/DC conversion circuit, and the bypass circuit is disposed between the switch and the power circuit. The bypass circuit is a unidirectional conduction circuit. In this way, a problem that a circuit loss is relatively large when an input end of a DC/DC conversion circuit is reversely connected to an external power supply is resolved, to reduce a loss of the DC/DC conversion circuit when the input end is reversely connected to the external power supply.

In a possible design, the DC/DC conversion circuit further includes a controller. The controller is connected to the switch S, and the controlling the switch S to be closed when the input end is reversely connected to the external power supply includes detecting, by the controller, a current or a voltage at an output end of the external power supply, to determine whether the input end is reversely connected to the external power supply, and when determining that the input end is reversely connected to the external power supply, controlling, by the controller, the switch S to be closed.

The current or the voltage at the output end of the external power supply is detected. Further, a direction of the current or the voltage is detected. In this way, it can be determined whether the output end of the external power supply is a positive electrode or a negative electrode, to determine whether the external power supply is reversely connected to the input end of the DC/DC conversion circuit.

In a possible design, the bypass circuit in the DC/DC conversion circuit includes a diode D, and the controlling the switch S to be closed when the input end is reversely connected to the external power supply, so that a current output by a positive electrode of the external power supply flows back to a negative electrode of the external power supply through the bypass circuit and the switch S includes controlling the switch S to be closed when the input end is reversely connected to the external power supply, so that the current output by the positive electrode of the external power supply flows back to the negative electrode of the external power supply through the diode D and the switch S, where that the external power supply is reversely connected includes a case in which an anode of the diode D is connected to the positive electrode of the external power supply.

The bypass circuit is set to including the diode D, so that the bypass circuit is a unidirectional conduction circuit.

In a possible design, when it is determined that the external power supply is reversely connected to the input end, after the current output by the positive electrode of the external power supply flows back to the negative electrode of the external power supply through the diode and the switch S, the method further includes controlling the switch S to be opened, so that the external power supply is disconnected from another circuit element of the DC/DC conversion circuit.

In a possible design, in an aspect of detecting the current or the voltage at the output end of the input power supply, to determine whether the input power supply is reversely connected, where that the external power supply is reversely connected includes the case in which the anode of the diode D is connected to the positive electrode of the external power supply, and that the input power supply is reversely connected includes that the anode of the diode D is connected to the negative electrode of the input power supply through the switch S.

According to a third aspect, an embodiment of this application provides a photovoltaic inverter, including a DC/DC conversion circuit, a DC/alternating current (AC) inverter circuit, and a filter circuit, where the DC/DC conversion circuit includes an input end, a power circuit, and an output end, and further includes a diode D, a switch S is disposed between the input end and the power circuit, the input end is configured to be connected to an external power supply, and the external power supply is configured to supply power to the DC/DC conversion circuit, the diode D is connected between the input end and the power circuit, the diode is disposed between the switch S and the power circuit, and the diode D is connected to the power circuit in parallel, and the switch S is closed when the input end is reversely connected to the external power supply, so that a current output by a positive electrode of the external power supply flows back to a negative electrode of the external power supply through the diode and the switch S. That the external power supply is reversely connected includes a case in which an anode of the diode D is connected to the positive electrode of the external power supply.

An embodiment of this application provides a photovoltaic inverter, including the foregoing DC/DC conversion circuit. A switch is disposed between an input end of the DC/DC conversion circuit and a power circuit in the DC/DC conversion circuit, and a diode is disposed between the switch and the power circuit. In this way, a problem that a circuit loss is relatively large when an input end of a DC/DC conversion circuit is reversely connected to an external power supply is resolved, to reduce a loss of the DC/DC conversion circuit when the input end is reversely connected to the external power supply.

In a possible design, in the photovoltaic inverter, the DC/DC conversion circuit further includes a controller, where the controller is configured to detect a current or a voltage at an output end of the external power supply, to determine whether the input end is reversely connected to the external power supply, and the controller is further configured to when determining that the input end is reversely connected to the external power supply, control the switch S to be closed.

In a possible design, in the photovoltaic inverter, the DC/DC conversion circuit further includes a controller, and the controller is configured to when determining that the input end is reversely connected to the external power supply, control the switch S to be opened.

In a possible design, in the photovoltaic inverter, when the input end is reversely connected to the external power supply, an anode of the diode D is connected to the positive electrode of the external power supply, or an anode of the diode D is connected to the positive electrode of the external power supply through the switch S.

According to a fourth aspect, an embodiment of this application provides a communications system, including a communications device and a communications power supply. The communications power supply is configured to supply power to the communications device, and the power supply includes a DC/DC conversion circuit, the DC/DC conversion circuit includes an input end, a power circuit, and an output end, and further includes a bypass circuit, and the bypass circuit is a unidirectional conduction circuit, a switch S is disposed between the input end and the power circuit, the input end is configured to be connected to one or more external power supplies, and the external power supply is configured to supply power to the DC/DC conversion circuit, the bypass circuit is connected between the input end and the power circuit, the bypass circuit is disposed between the switch S and the power circuit, and the bypass circuit is connected to the power circuit in parallel, and the switch S is configured to be closed when the input end is reversely connected to the external power supply, so that a current output by a positive electrode of the external power supply flows back to a negative electrode of the external power supply through the bypass circuit and the switch S.

In a possible design, in the communications system, the bypass circuit in the DC/DC conversion circuit includes a diode D, and that the external power supply is reversely connected includes a case in which an anode of the diode D is connected to the positive electrode of the external power supply.

An embodiment of this application provides a communications system, including a communications device and a communications power supply. The communications power supply is configured to supply power to the communications device, and the power supply includes a DC/DC conversion circuit, including the foregoing DC/DC conversion circuit. A switch is disposed between an input end of the DC/DC conversion circuit and a power circuit in the DC/DC conversion circuit, and a diode is disposed between the switch and the power circuit. In this way, a problem that a circuit loss is relatively large when an input end of a DC/DC conversion circuit is reversely connected to an external power supply is resolved, to reduce a loss of the DC/DC conversion circuit when the input end is reversely connected to the external power supply, thereby improving efficiency of the communications system.

DESCRIPTION OF EMBODIMENTS

A method and an apparatus provided in embodiments of this application are based on a same concept. Because problem solving principles of the method and the apparatus are similar, mutual reference may be made to implementations of the apparatus and the method. Repeated descriptions are not described.

An embodiment of this application provides a DC/DC conversion circuit. A switch is disposed between an input end of the DC/DC conversion circuit and a power circuit in the DC/DC conversion circuit, and a bypass circuit is disposed between the switch and the power circuit. The bypass circuit is a unidirectional conduction circuit, and the bypass circuit includes a diode. In this way, a problem that a circuit loss is relatively large when an input end of the DC/DC conversion circuit is reversely connected to an external power supply is resolved, to reduce a loss of the DC/DC conversion circuit when the input end is reversely connected to the external power supply.

Figure 1:
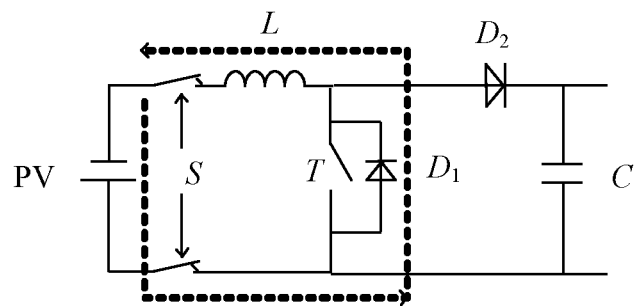
FIG. 1 is a schematic structural diagram of a DC/DC conversion circuit.
Figure 2:
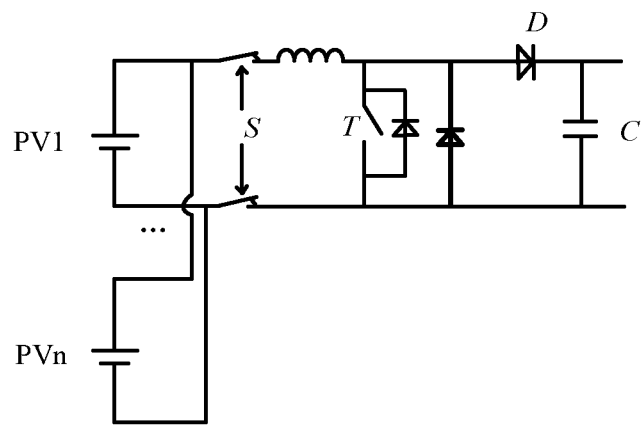
FIG. 2 is a schematic structural diagram of a DC/DC conversion circuit.
Figure 3:
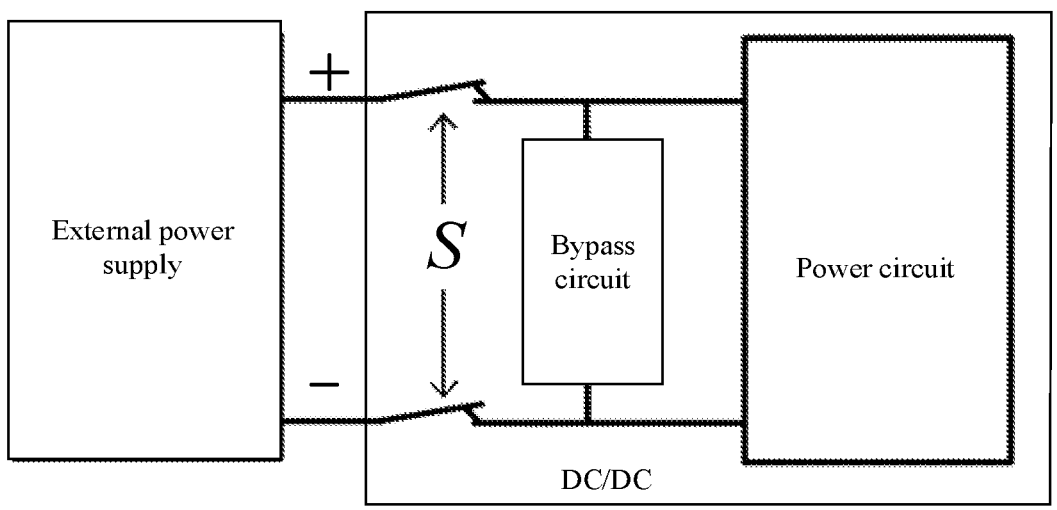
FIG. 3 is a schematic structural diagram of a DC/DC conversion circuit according to an embodiment of this application.

FIG. 3 is a schematic structural diagram of a DC/DC conversion circuit according to an embodiment of this application. An application scenario of the conversion circuit is that an external power supply supplies power to the DC/DC conversion circuit, and the DC/DC conversion circuit performs adjustment and conversion on a voltage output by the external power supply. The external power supply includes but is not limited to a photovoltaic panel power supply, or includes another type of power supply form.

The DC/DC conversion circuit includes an input end, an output end, a power circuit, and a bypass circuit, a switch S is further disposed between the input end and the power circuit, and the input end is configured to be connected to the external power supply in FIG. 3.

When the input end is positively connected to the external power supply, the bypass circuit is not conducted and does not work. The bypass circuit has unidirectional continuity. The external power supply is configured to supply power to the DC/DC conversion circuit. The external power supply includes but is not limited to the photovoltaic panel power supply or another type of power supply form. In a possible implementation of this embodiment of this application, when there is a plurality of external power supplies in the DC/DC conversion circuit, the plurality of external power supplies are disposed in parallel, to increase an input current of the power circuit.

Figure 4:
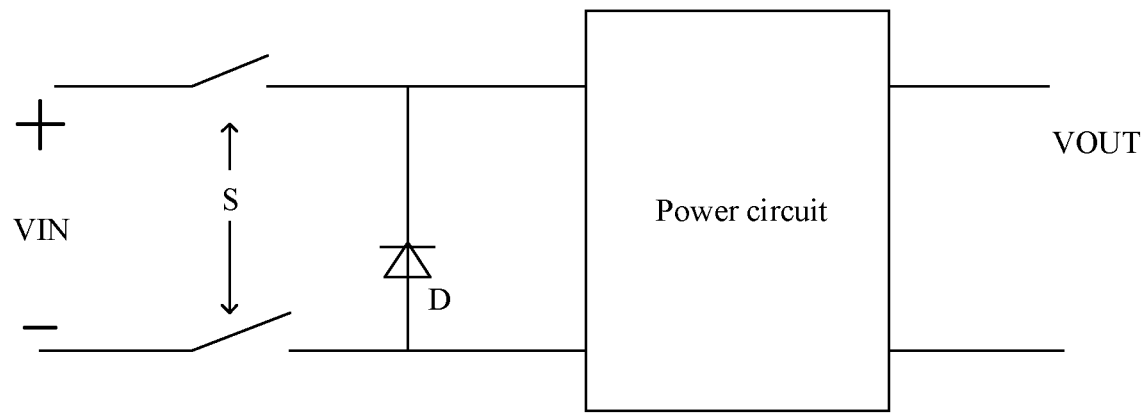
FIG. 4 is a schematic structural diagram of another DC/DC conversion circuit according to an embodiment of this application.

FIG. 4 is a schematic structural diagram of a DC/DC conversion circuit according to an embodiment of this application.

The DC/DC conversion circuit includes an input end, a power circuit, an output end, and a bypass circuit, and the bypass circuit includes a diode D.

A switch S is disposed between the input end and the power circuit, and the input end is configured to be connected to an external power supply. The external power supply is configured to supply power to the DC/DC conversion circuit. The external power supply includes but is not limited to a photovoltaic panel power supply or another type of power supply form. The diode D is connected between the input end and the power circuit, the diode is disposed between the switch S and the power circuit, and the diode D is connected to the power circuit in parallel.

Further, the diode D is disposed between the switch S and the power circuit, and the diode D and the power circuit are disposed in parallel, so that when the input end is reversely connected to the external power supply, a current output by the external power supply passes through the diode D and the switch S to form a closed loop, to isolate the power circuit, reduce a loss of the power circuit, and reduce impact of an overvoltage or an overcurrent that is of a switch component and that is caused by a case in which the external power supply is reversely connected.

The switch S is closed when the input end is reversely connected to the external power supply, so that a current output by a positive electrode of the external power supply flows back to a negative electrode of the external power supply through the diode and the switch S. That the external power supply is reversely connected includes a case in which an anode of the diode D is connected to the positive electrode of the external power supply.

Further, in a normal working case, the input end is positively connected to the external power supply, the anode of the diode D is connected to the negative electrode of the external power supply, or the anode of the diode D is connected to the negative electrode of the external power supply through the switch S. When the input end is positively connected to the external power supply, the external circuit normally supplies power to the DC/DC power circuit.

This embodiment of this application provides the DC/DC conversion circuit. The switch is disposed between the input end of the DC/DC conversion circuit and the power circuit in the DC/DC conversion circuit, and the diode is disposed between the switch and the power circuit. In this way, a problem that a circuit loss is relatively large when the input end of the DC/DC conversion circuit is reversely connected to the external power supply is resolved, to reduce a loss of the DC/DC conversion circuit when the input end is reversely connected to the external power supply.

Optionally, in a possible implementation of this embodiment of this application, in the DC/DC conversion circuit, when the input end is reversely connected to the external power supply, the anode of the diode D is connected to the positive electrode of the external power supply, or the anode of the diode D is connected to the positive electrode of the external power supply through the switch S.

A location of the diode D is set. To be specific, the location of the diode D is disposed between the switch and the power circuit, so that when the input end is reversely connected to the external power supply, the external power supply and the diode D form a loop, to bypass the power circuit.

Optionally, in a possible implementation of this embodiment of this application, in the DC/DC conversion circuit, when the input end is positively connected to the external power supply, the anode of the diode D is connected to the negative electrode of the external power supply, or the anode of the diode D is connected to the negative electrode of the external power supply through the switch S.

When the external power supply is positively connected, the DC/DC conversion circuit works normally, and the external power supply normally supplies power to the power circuit in the DC/DC conversion circuit.

Optionally, in a possible implementation of this embodiment of this application, in the DC/DC conversion circuit, when the input end is positively connected to the external power supply, the switch S is closed, so that the current output by the external power supply flows back to the negative electrode of the external power supply through the switch S and the power circuit.

Figure 5:
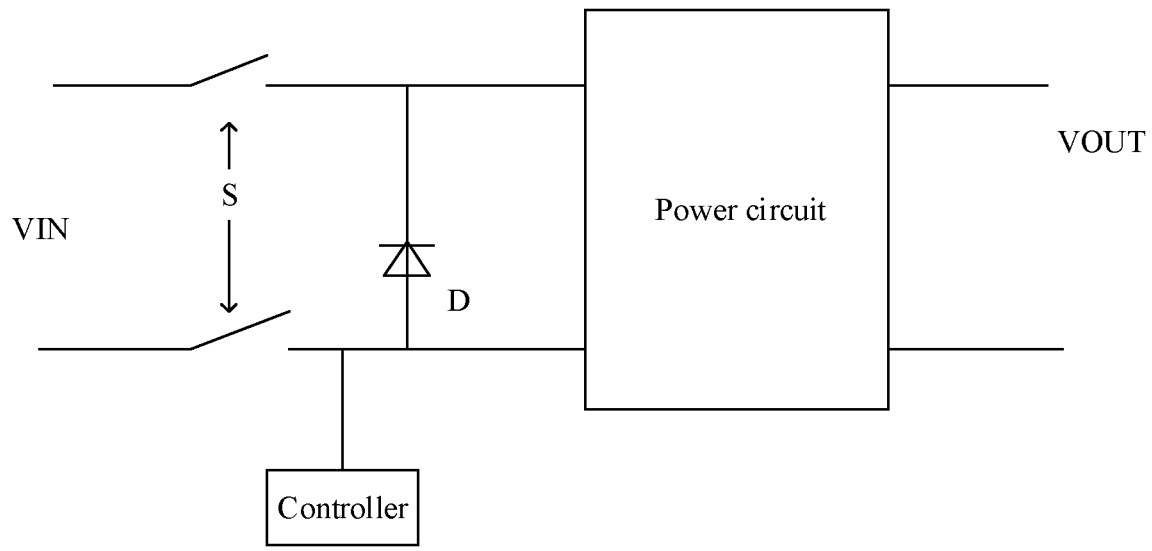
FIG. 5 is a schematic structural diagram of another DC/DC conversion circuit according to an embodiment of this application.

As shown in FIG. 5, in a possible implementation of this embodiment of this application, the DC/DC conversion circuit further includes a controller, and the controller is configured to detect a current or a voltage at an output end of the external power supply, to determine whether the input end is reversely connected to the external power supply.

Further, after the external power supply is connected to the input end of the DC/DC conversion circuit, the switch S is closed, and the controller is configured to detect the current or the voltage at the output end of the external power supply, or detect a current or a voltage at the input end of the DC/DC conversion circuit. If it is detected that a direction of the current or the voltage is opposite to a preset direction, and the preset direction is a direction of the current or the voltage at the input end of the DC/DC conversion circuit when the DC/DC conversion circuit works normally, it is determined whether the external power supply is reversely connected to the input end of the DC/DC conversion circuit. The controller may be integrated into a controller of the DC/DC conversion circuit, so that a function of the controller is implemented by using the controller of the DC/DC conversion circuit. The controller may alternatively be replaced by manual detection.

Figure 6:
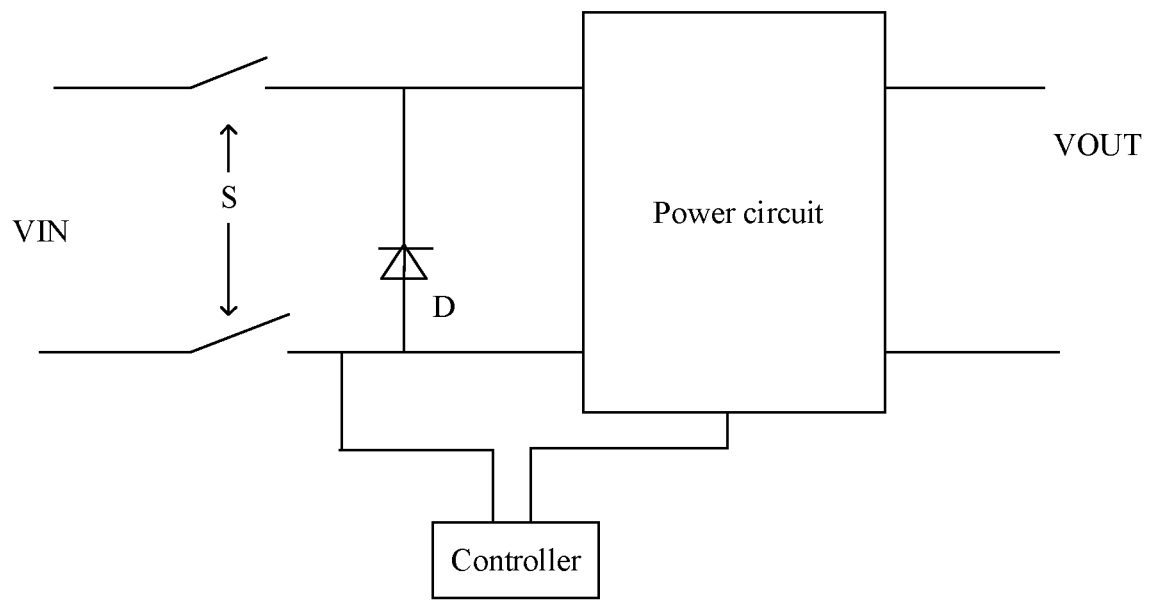
FIG. 6 is a schematic structural diagram of another DC/DC conversion circuit according to an embodiment of this application.

As shown in FIG. 6, in a possible implementation of this embodiment of this application, the DC/DC conversion circuit includes a controller, and the controller is configured to detect a current or a voltage at an output end of the external power supply, to determine whether the input end is reversely connected to the external power supply.

The controller is configured to when determining that the input end is reversely connected to the external power supply, control the switch S to be opened.

Further, when the controller detects that a direction of the current or the voltage at the output end of the external power supply is reversed, or detects that a direction of a current or a voltage at the input end of the DC/DC conversion circuit is reversed, it indicates that the input end is reversely connected to the external power supply, and the controller controls the switch S to be opened. In a period in which the input end is connected to the external power supply and the switch S is closed, until the switch S is opened, the current output by the positive electrode of the external power supply flows back to the negative electrode of the external power supply through a closed loop including the diode and the switch S, to isolate the power circuit, reduce a loss of the power circuit, and avoid a case in which an extremely large short-circuit current imposes impact on the switch component and even causes the switching component in the DC/DC conversion circuit to be burnt out.

The controller may be integrated into a controller of the DC/DC conversion circuit, and the controller of the DC/DC conversion circuit includes but is not limited to a switch controller of the DC/DC conversion circuit.

Figure 7:
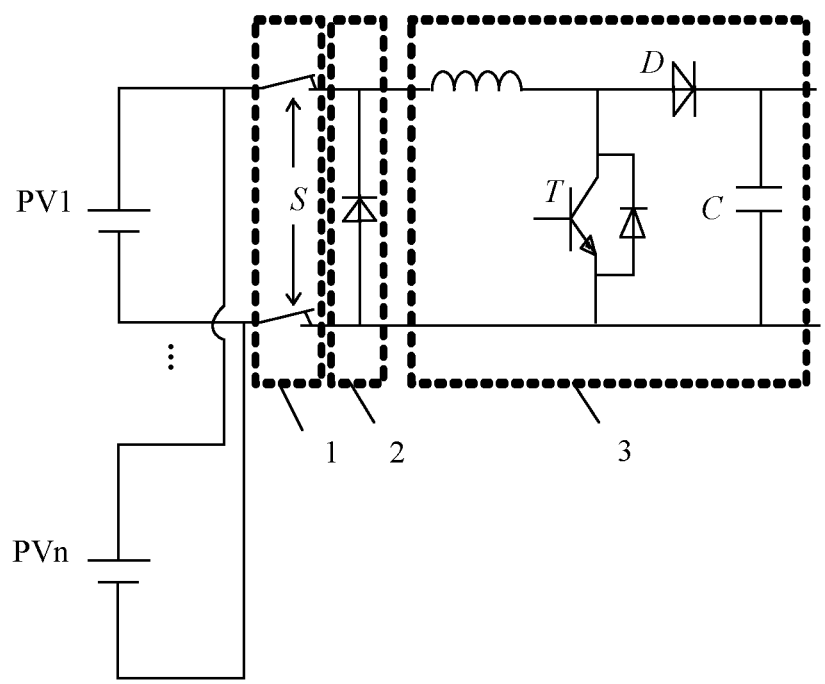
FIG. 7 is a schematic structural diagram of another DC/DC conversion circuit according to an embodiment of this application.

As shown in FIG. 7, in a possible implementation of this embodiment of this application, when there is a plurality of external power supplies in the DC/DC conversion circuit, the plurality of external power supplies is disposed in parallel, to increase an input current of the power circuit.

Further, the power circuit in the DC/DC conversion circuit includes a forward boost circuit, a reverse boost circuit, a buck-boost circuit, a Cuk circuit, a SEPIC circuit, a Zeta circuit, or a bidirectional buck/boost circuit.

Figure 8:
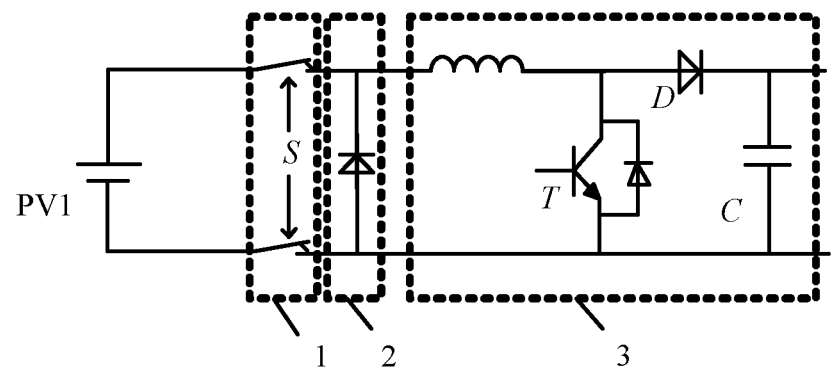
FIG. 8 is a schematic structural diagram of another DC/DC conversion circuit according to an embodiment of this application.

As shown in FIG. 8, in a possible implementation of this embodiment of this application, the power circuit in the DC/DC conversion circuit is a forward boost circuit.

In FIG. 8, a dashed-line box 1 shows the switch, a dashed-line box 2 shows the diode, and a dashed-line box 3 shows the forward boost power circuit.

Figure 9:
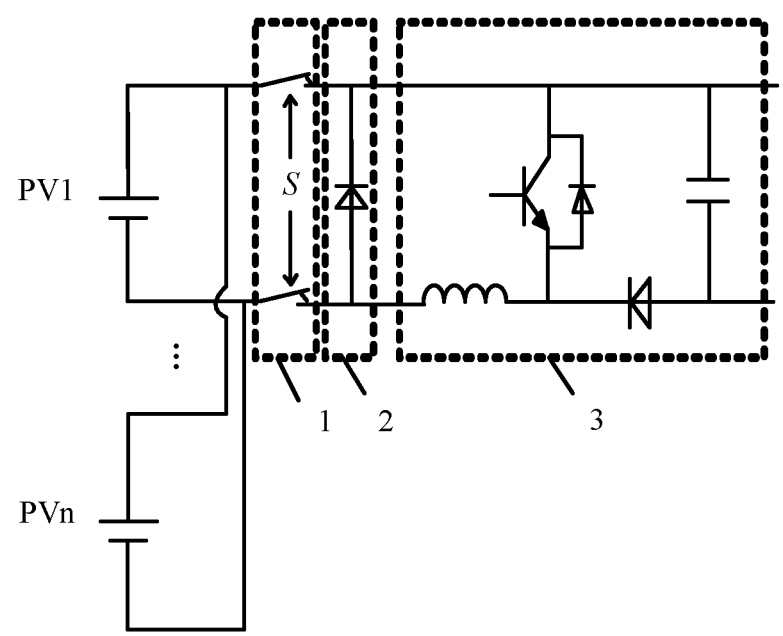
FIG. 9 is a schematic structural diagram of another DC/DC conversion circuit according to an embodiment of this application.

As shown in FIG. 9, in a possible implementation of this embodiment of this application, the power circuit in the DC/DC conversion circuit is a reverse boost circuit.

In FIG. 9, a dashed-line box 1 shows the switch, a dashed-line box 2 shows the diode, and a dashed-line box 3 shows the reverse boost power circuit.

Figure 10:
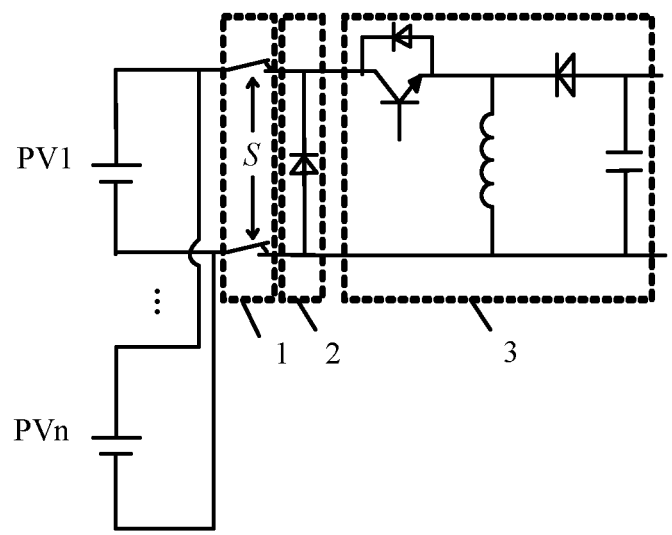
FIG. 10 is a schematic structural diagram of another DC/DC conversion circuit according to an embodiment of this application.

As shown in FIG. 10, in a possible implementation of this embodiment of this application, the power circuit in the DC/DC conversion circuit is a buck-boost circuit.

In FIG. 10, a dashed-line box 1 shows the switch, a dashed-line box 2 shows the diode, and a dashed-line box 3 shows the buck-boost power circuit.

Figure 11:
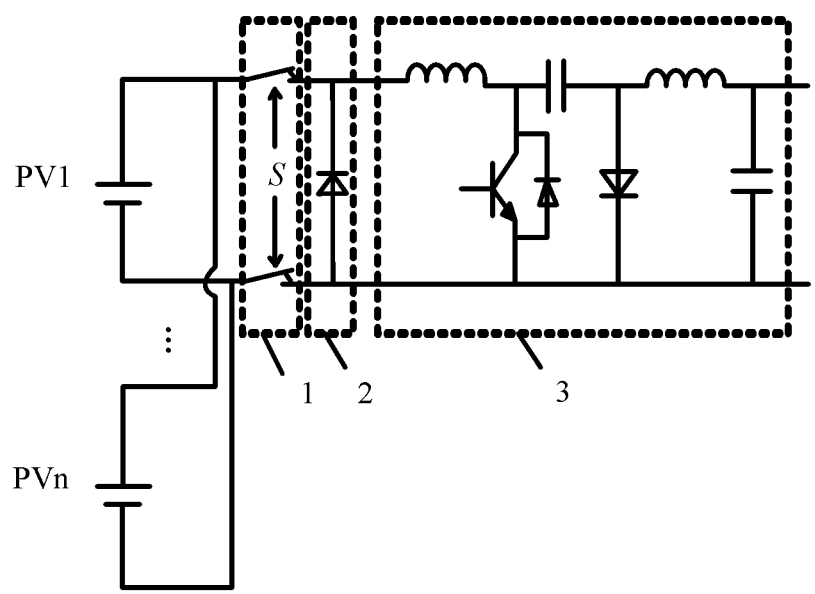
FIG. 11 is a schematic structural diagram of another DC/DC conversion circuit according to an embodiment of this application.

As shown in FIG. 11, in a possible implementation of this embodiment of this application, the power circuit in the DC/DC conversion circuit is a Cuk circuit. In FIG. 11, a dashed-line box 1 shows the switch, a dashed-line box 2 shows the diode, and a dashed-line box 3 shows the Cuk power circuit.

Figure 12:
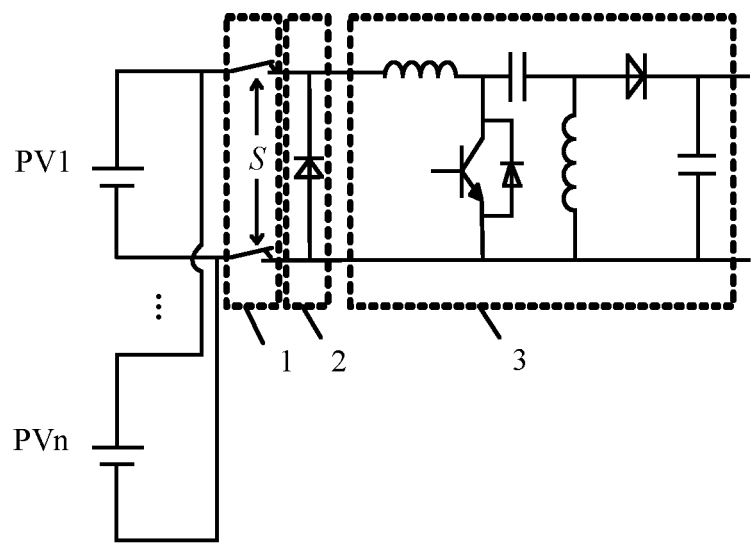
FIG. 12 is a schematic structural diagram of another DC/DC conversion circuit according to an embodiment of this application.

As shown in FIG. 12, in a possible implementation of this embodiment of this application, the power circuit in the DC/DC conversion circuit is a SEPIC circuit.

In FIG. 12, a dashed-line box 1 shows the switch, a dashed-line box 2 shows the diode, and a dashed-line box 3 shows the SEPIC power circuit.

Figure 13:
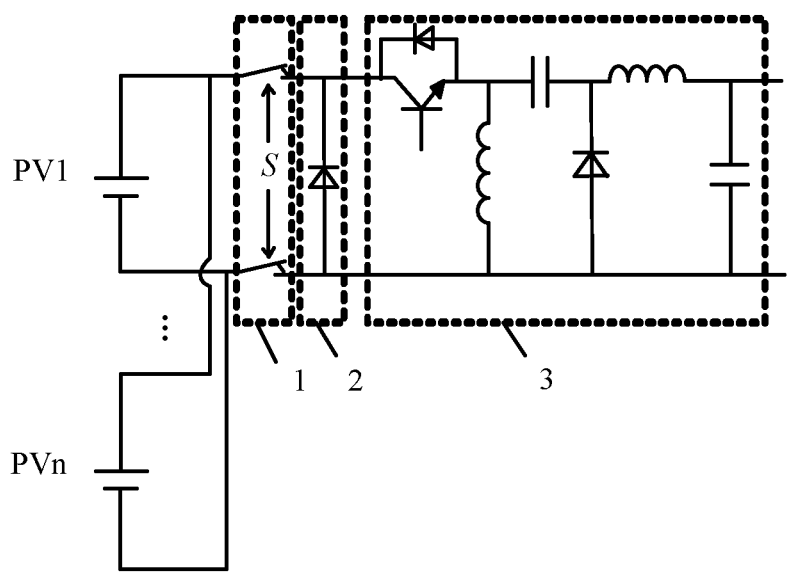
FIG. 13 is a schematic structural diagram of another DC/DC conversion circuit according to an embodiment of this application.

As shown in FIG. 13, in a possible implementation of this embodiment of this application, the power circuit in the DC/DC conversion circuit is a Zeta circuit.

In FIG. 13, a dashed-line box 1 shows the switch, a dashed-line box 2 shows the diode, and a dashed-line box 3 shows the Zeta power circuit.

Figure 14:
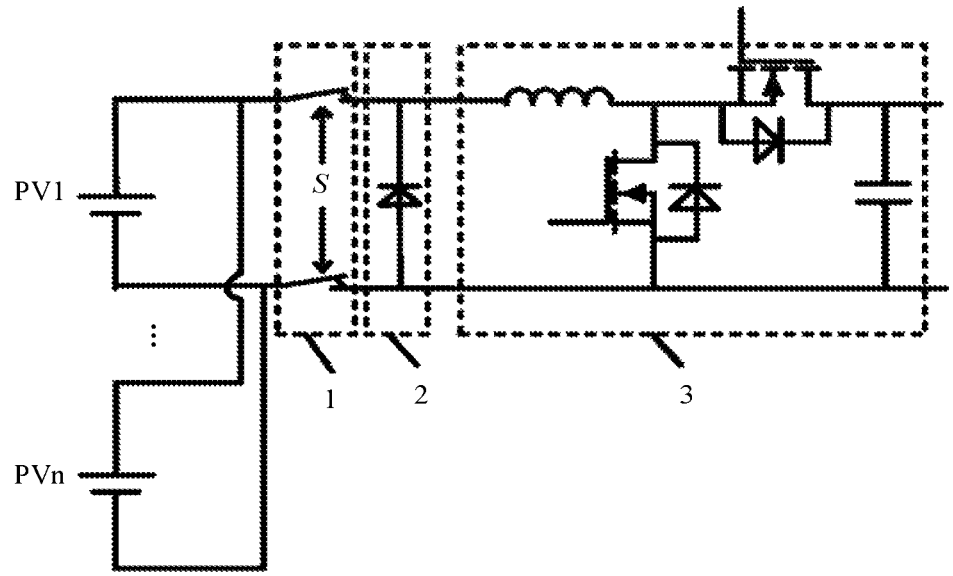
FIG. 14 is a schematic structural diagram of another DC/DC conversion circuit according to an embodiment of this application.

As shown in FIG. 14, in a possible implementation of this embodiment of this application, the power circuit in the DC/DC conversion circuit is a bidirectional buck/boost circuit.

In FIG. 14, a dashed-line box 1 shows the switch, a dashed-line box 2 shows the diode, and a dashed-line box 3 shows the bidirectional buck/boost power circuit.

In a possible implementation, in the DC/DC conversion circuit, the controller includes a switch controller, and the switch controller is configured to when determining that the input end is reversely connected to the external power supply, control the switch S to be opened.

In a possible implementation, the switch S includes a relay, a contactor, a semiconductor bidirectional switch, or a mechanical switch. Alternatively, the switch S is a switch of a manually-opened switch.

An embodiment of this application provides a method for controlling a DC/DC conversion circuit. The DC/DC conversion circuit includes an input end, a power circuit, and an output end, and further includes a bypass circuit. The bypass circuit is a unidirectional conduction circuit, a switch S is disposed between the input end and the power circuit, the input end is configured to be connected to an external power supply, the external power supply is configured to supply power to the DC/DC conversion circuit, the bypass circuit is connected between the input end and the power circuit, the diode is disposed between the switch S and the power circuit, and the bypass circuit is connected to the power circuit in parallel.

The method includes controlling the switch S to be closed when the input end is reversely connected to the external power supply, so that a current output by a positive electrode of the external power supply flows back to a negative electrode of the external power supply through the bypass circuit and the switch S.

This embodiment of this application provides a photovoltaic inverter, including the foregoing DC/DC conversion circuit. The switch is disposed between the input end of the DC/DC conversion circuit and the power circuit in the DC/DC conversion circuit, and the bypass circuit is disposed between the switch and the power circuit. The bypass circuit is a unidirectional conduction circuit. In this way, a problem that a circuit loss is relatively large when the input end of the DC/DC conversion circuit is reversely connected to the external power supply is resolved, to reduce a loss of the DC/DC conversion circuit when the input end is reversely connected to the external power supply.

Figure 15:
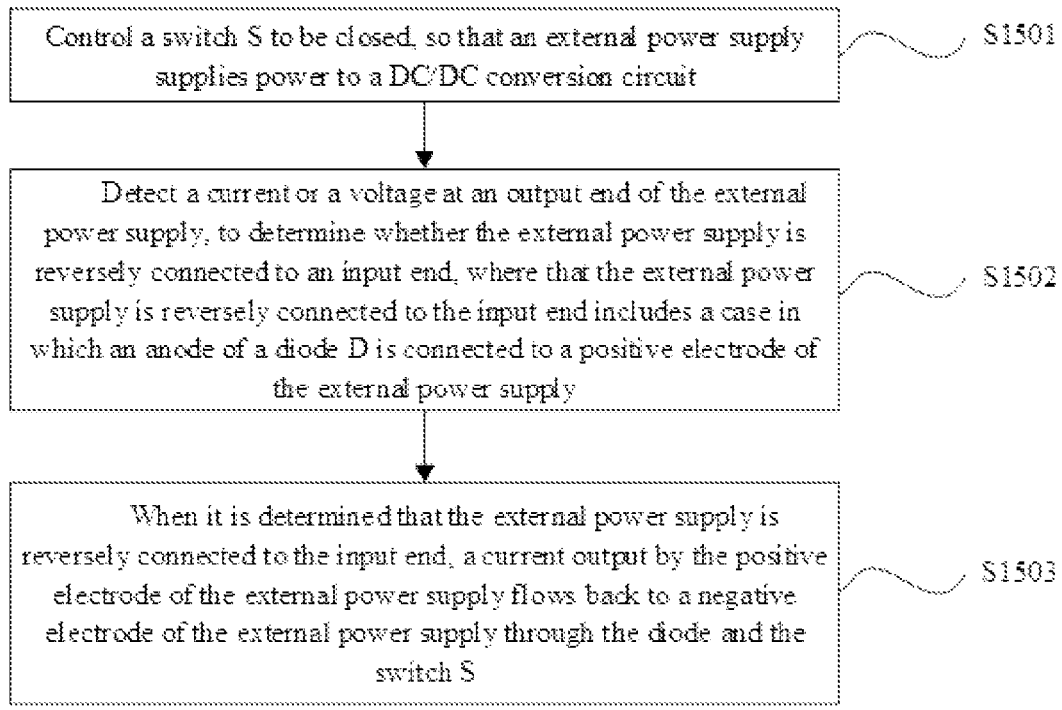
FIG. 15 is a flowchart of a method for controlling a conversion circuit according to an embodiment of this application.

As shown in FIG. 15, an embodiment of this application provides a method for controlling a DC/DC conversion circuit. The DC/DC conversion circuit includes an input end, a power circuit, and an output end, and further includes a diode D. A switch S is disposed between the input end and the power circuit, and the input end is configured to be connected to an external power supply. The external power supply is configured to supply power to the DC/DC conversion circuit.

The diode D is connected between the input end and the power circuit, the diode is disposed between the switch S and the power circuit, and the diode D is connected to the power circuit in parallel.

The method includes the following steps.

Step S1501: Control the switch S to be closed, so that the external power supply supplies power to the DC/DC conversion circuit.

Step S1052: Detect a current or a voltage at an output end of the external power supply, to determine whether the external power supply is reversely connected to the input end, where that the external power supply is reversely connected to the input end includes a case in which an anode of the diode D is connected to a positive electrode of the external power supply.

Step S1053: When it is determined that the external power supply is reversely connected to the input end, a current output by the positive electrode of the external power supply flows back to a negative electrode of the external power supply through the diode and the switch S.

Further, the method is applied to the DC/DC conversion circuit, and the power circuit in the DC/DC conversion circuit may be a forward boost circuit, a reverse boost circuit, a buck-boost circuit, a Cuk circuit, a SEPIC circuit, a Zeta circuit, or a bidirectional buck/boost circuit, as shown in FIG. 8 to FIG. 14.

In a possible implementation, an embodiment of this application provides a method for controlling a DC/DC conversion circuit, including the following steps Step S1501: Control the switch S to be closed, so that the external power supply supplies power to the DC/DC conversion circuit.

Step S1052: Detect a current or a voltage at an output end of the external power supply, to determine whether the external power supply is reversely connected to the input end, where that the external power supply is reversely connected to the input end includes a case in which an anode of the diode D is connected to a positive electrode of the external power supply.

Step S1053: When it is determined that the external power supply is reversely connected to the input end, a current output by the positive electrode of the external power supply flows back to a negative electrode of the external power supply through the diode and the switch S.

Step S1054: Control the switch S to be opened, so that the external power supply is disconnected from another circuit element of the DC/DC conversion circuit.

When it is determined that the external power supply is reversely connected to the input end, after the current output by the positive electrode of the external power supply flows back to the negative electrode of the external power supply through the diode and the switch S, the method further includes controlling the switch S to be opened, so that the external power supply is disconnected from the other circuit element of the DC/DC conversion circuit. The external power supply can be disconnected from another circuit element of the DC/DC conversion circuit, and the other circuit element includes the power circuit in the DC/DC conversion circuit.

In a possible implementation, in an aspect of detecting the current or the voltage at the output end of the input power supply, to determine whether the input end is reversely connected to the external power supply, where that the input end is reversely connected to the external power supply includes the case in which the anode of the diode D is connected to the positive electrode of the external power supply, and that the input end is reversely connected to the external power supply includes that the anode of the diode D is connected to the negative electrode of the external power supply through the switch S.

Further, in a possible implementation of the method for controlling a DC/DC conversion circuit provided in this embodiment of this application, the DC/DC conversion circuit further includes a controller, and the controller is configured to detect the current or the voltage at the output end of the external power supply, to determine whether the input end is reversely connected to the external power supply.

In a possible implementation of the method for controlling a DC/DC conversion circuit provided in this embodiment of this application, the DC/DC conversion circuit to which the method is applied further includes a controller, and the controller is configured to when determining that the input end is reversely connected to the external power supply, control the switch S to be opened.

Further, when the controller detects that a direction of the current or the voltage at the output end of the external power supply is reversed, or detects that a direction of a current or a voltage at the input end of the DC/DC conversion circuit is reversed, it indicates that the input end is reversely connected to the external power supply, and the controller controls the switch S to be opened. In a period in which the input end is connected to the external power supply and the switch S is closed, until the switch S is opened, the current output by the positive electrode of the external power supply flows back to the negative electrode of the external power supply through a closed loop including the diode and the switch S, to isolate the power circuit, reduce a loss of the power circuit, and avoid a case in which an extremely large short-circuit current imposes impact on the switch component and even causes the switching component in the DC/DC conversion circuit to be burnt out.

This embodiment of this application provides the method for controlling a DC/DC conversion circuit, applied to the DC/DC conversion circuit. The switch is disposed between the input end of the DC/DC conversion circuit and the power circuit in the DC/DC conversion circuit, the diode is disposed between the switch and the power circuit, and when the input end is reversely connected to the external power supply, the switch S is closed, so that the current output by the positive electrode of the external power supply flows back to the negative electrode of the external power supply through the diode and the switch S. That the input end is reversely connected to the external power supply includes that the anode of the diode D is connected to the positive electrode of the external power supply. In this way, a problem that a circuit loss is relatively large when the input end of the DC/DC conversion circuit is reversely connected to the external power supply is resolved, to reduce a loss of the DC/DC conversion circuit when the input end is reversely connected to the external power supply, and improve efficiency of the photovoltaic inverter.

Figure 16:
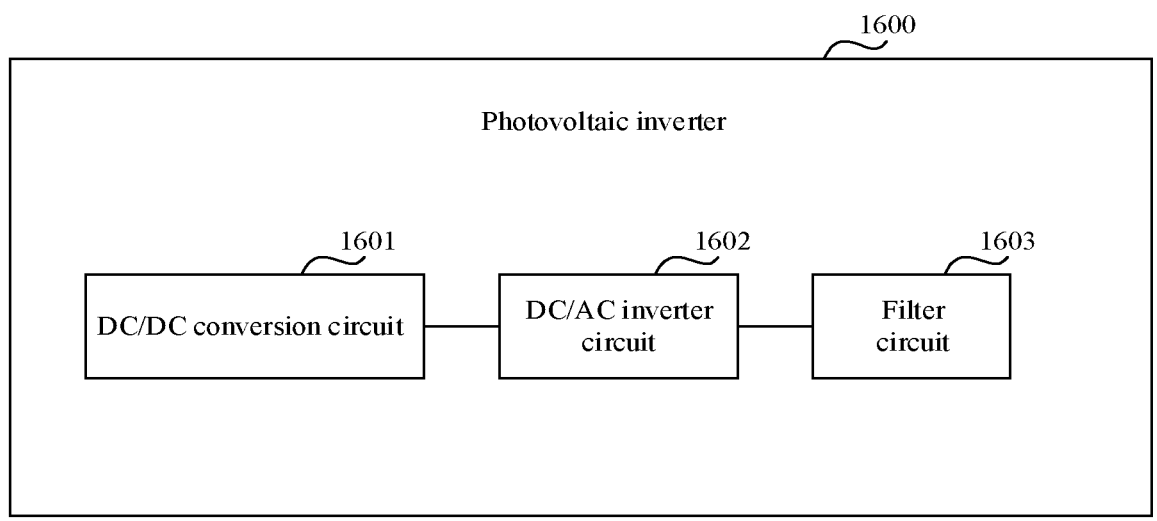
FIG. 16 is a schematic structural diagram of a photovoltaic inverter according to an embodiment of this application.

As shown in FIG. 16, an embodiment of this application provides a photovoltaic inverter 1600, including a DC/DC conversion circuit 1601, a DC/AC inverter circuit 1602, and a filter circuit 1603. The DC/DC conversion circuit includes an input end, a power circuit, and an output end, and further includes a diode D.

A switch S is disposed between the input end and the power circuit, the input end is configured to be connected to an external power supply, and the external power supply is configured to supply power to the DC/DC conversion circuit 1601.

The diode D is connected between the input end and the power circuit, the diode is disposed between the switch S and the power circuit, and the diode D is connected to the power circuit in parallel.

The switch S is closed when the input end is reversely connected to the external power supply, so that a current output by a positive electrode of the external power supply flows back to a negative electrode of the external power supply through the diode and the switch S. That the external power supply is reversely connected includes a case in which an anode of the diode D is connected to the positive electrode of the external power supply.

The input end of the DC/DC conversion circuit 1601 is connected to an output end of a photovoltaic panel or an optimizer, or is connected to another external power supply. The output end of the DC/DC conversion circuit 1601 is connected to an input end of the DC/AC inverter circuit 1602. An output end of the DC/AC inverter circuit 1602 is connected to an input end of the filter circuit 1603. The DC/DC conversion circuit 1601 is configured to boost a voltage of a direct current input to the photovoltaic inverter in a photovoltaic system, and output the boosted direct current to the DC/AC inverter circuit 1602 for inversion. The DC/DC inverter circuit 1602 inverts the direct current into an alternating current, and outputs the AC to the filter circuit 1603 for filtering. Then the AC is supplied to a load or an access power grid. The power circuit in the DC/DC conversion circuit includes a forward boost circuit, a reverse boost circuit, a buck-boost circuit, a Cuk circuit, a SEPIC circuit, a Zeta circuit, or a bidirectional buck/boost circuit, as shown in FIG. 8 to FIG. 14. In a possible implementation of this embodiment of this application, when there is a plurality of external power supplies in the DC/DC conversion circuit, the plurality of external power supplies is disposed in parallel, to increase an input current of the power circuit.

In a possible implementation of the photovoltaic inverter provided in this embodiment of this application, the DC/DC conversion circuit further includes a controller, and the controller is configured to detect a current or a voltage at an output end of the external power supply, to determine whether the input end is reversely connected to the external power supply.

In a possible implementation of the photovoltaic inverter provided in this embodiment of this application, the DC/DC conversion circuit further includes a controller, and the controller is configured to when determining that the input end is reversely connected to the external power supply, control the switch S to be opened.

Further, when the controller detects that a direction of the current or the voltage at the output end of the external power supply is reversed, or detects that a direction of a current or a voltage at the input end of the DC/DC conversion circuit is reversed, it indicates that the input end is reversely connected to the external power supply, and the controller controls the switch S to be opened. In a period in which the input end is connected to the external power supply and the switch S is closed, until the switch S is opened, the current output by the positive electrode of the external power supply flows back to the negative electrode of the external power supply through a closed loop including the diode and the switch S, to isolate the power circuit, reduce a loss of the power circuit, and avoid a case in which an extremely large short-circuit current imposes impact on the switch component and even causes the switching component in the DC/DC conversion circuit to be burnt out.

The controller may be integrated into a controller of the DC/DC conversion circuit, and the controller of the DC/DC conversion circuit includes but is not limited to a switch controller of the DC/DC conversion circuit.

In a possible implementation of the photovoltaic inverter provided in this embodiment of this application, when the input end is reversely connected to the external power supply, the anode of the diode D is connected to the positive electrode of the external power supply, or the anode of the diode D is connected to the positive electrode of the external power supply through the switch S.

This embodiment of this application provides the photovoltaic inverter, including the foregoing DC/DC conversion circuit. The switch is disposed between the input end of the DC/DC conversion circuit and the power circuit in the DC/DC conversion circuit, and the diode is disposed between the switch and the power circuit. In this way, a problem that a circuit loss is relatively large when the input end of the DC/DC conversion circuit is reversely connected to the external power supply is resolved, to reduce a loss of the DC/DC conversion circuit when the input end is reversely connected to the external power supply, and improve efficiency of the photovoltaic inverter.

An embodiment of this application provides a communications system, including a communications device and a communications power supply. The communications power supply is configured to supply power to the communications device.

The power supply includes a DC/DC conversion circuit, the DC/DC conversion circuit includes an input end, a power circuit, and an output end, and further includes a bypass circuit. The bypass circuit is a unidirectional conduction circuit.

A switch S is disposed between the input end and the power circuit, the input end is configured to be connected to one or more external power supplies, and the external power supply is configured to supply power to the DC/DC conversion circuit.

The bypass circuit is connected between the input end and the power circuit, the bypass circuit is disposed between the switch S and the power circuit, and the bypass circuit is connected to the power circuit in parallel.

The switch S is configured to be closed when the input end is reversely connected to the external power supply, so that a current output by a positive electrode of the external power supply flows back to a negative electrode of the external power supply through the bypass circuit and the switch S.

In a possible implementation of the communications system provided in this embodiment of this application, the bypass circuit in the DC/DC conversion circuit includes a diode D, and that the external power supply is reversely connected includes a case in which an anode of the diode D is connected to the positive electrode of the external power supply.

It is clear that, a person skilled in the art can make various modifications and variations to this application without departing from the spirit and scope of this application. This application is intended to cover these modifications and variations of this application provided that they fall within the scope of protection defined by the following claims and their equivalent technologies.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are completely or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

What is claimed is:

1. A direct current (DC)/DC conversion circuit comprising:
   an input end configured to couple to an external power supply to receive power at the DC/DC conversion circuit;
   a power circuit;
   a first output end;
   a switch disposed between the input end and the power circuit; and
   a bypass circuit coupled between the input end and the power circuit and disposed between the switch and the power circuit, wherein the bypass circuit is a unidirectional conduction circuit and is coupled to the power circuit in parallel,
   wherein the switch is configured to be closed when the input end is reversely coupled to the external power supply, and
   wherein when the switch is closed and when the input end is reversely coupled to the external power supply, the DC/DC conversion circuit is configured to:
      receive a first current from a positive electrode of the external power supply; and
      output the first current to a negative electrode of the external power supply through the bypass circuit and the switch.

2. The DC/DC conversion circuit of claim 1, further comprising a controller coupled to the switch and configured to:
   detect a second current or a voltage at a second output end of the external power supply to determine whether the input end is reversely coupled to the external power supply; and
   control the switch to be closed when the input end is reversely coupled to the external power supply.

3. The DC/DC conversion circuit of claim 2, wherein the bypass circuit comprises a diode, and wherein the controller is further configured to:
   identify that an anode of the diode is coupled to the positive electrode; and
   determine, in response to the identifying, that the input end is reversely coupled to the external power supply.

4. The DC/DC conversion circuit of claim 2, wherein the bypass circuit comprises a diode, and wherein the controller is further configured to:
   identify that an anode of the diode is coupled to the positive electrode through the switch; and
   determine, in response to the identifying, that the input end is reversely coupled to the external power supply.

5. The DC/DC conversion circuit of claim 2, wherein the bypass circuit comprises a diode, and wherein when the input end is positively coupled to the external power supply, the controller is further configured to:
   identify that an anode of the diode is coupled to the negative electrode; or
   identify that the anode is coupled to the negative electrode through the switch.

6. The DC/DC conversion circuit of claim 5, wherein the switch is further configured to be closed when the input end is positively coupled to the external power supply, and wherein when the switch is closed and when the input end is positively coupled to the external power supply, the DC/DC conversion circuit is further configured to further output the first current to the negative electrode through the switch and the power circuit.

7. The DC/DC conversion circuit of claim 1, wherein the external power supply comprises a plurality of external power supplies disposed in parallel.

8. The DC/DC conversion circuit of claim 1, wherein the power circuit comprises a forward boost circuit, a reverse boost circuit, a buck-boost circuit, a Cuk circuit, a single-ended primary-inductor converter (SEPIC) circuit, a Zeta circuit, or a bidirectional buck/boost circuit.

9. The DC/DC conversion circuit of claim 1, wherein the switch comprises a relay, a contactor, a semiconductor bidirectional switch, or a mechanical switch.

10. A method for controlling a direct current (DC)/DC conversion circuit, wherein the method comprises:
    controlling a switch of the DC/DC conversion circuit to be closed when an input end of the DC/DC conversion circuit is reversely coupled to an external power supply, wherein the switch is disposed between the input end and a power circuit of the DC/DC conversion circuit, and wherein the input end is coupled to the external power supply to receive power to the DC/DC conversion circuit; and
    when the switch is closed and when the input end is reversely coupled to the external power supply:
       receiving a first current from a positive electrode of the external power supply; and
       outputting the first current to a negative electrode of the external power supply through a bypass circuit of the DC/DC conversion circuit and the switch, wherein the bypass circuit is a unidirectional conduction circuit, wherein the bypass circuit is coupled between the input end and the power circuit and comprises a diode disposed between the switch and the power circuit, and wherein the bypass circuit is coupled to the power circuit in parallel.

11. The method of claim 10, further comprising:
    detecting, by a controller of the DC/DC conversion circuit, a second current or a voltage at an output end of the external power supply to determine whether the input end is reversely coupled to the external power supply, wherein the controller is coupled to the switch; and controlling, by the controller, the switch to be closed when the input end is reversely coupled to the external power supply.

12. The method of claim 11, wherein the bypass circuit comprises a diode, and wherein the method further comprises:
    identifying, by the controller, that an anode of the diode is coupled to the positive electrode;
    determining, by the controller in response to the identifying, that the input end is reversely coupled to the external power supply; and
    further outputting the first current to the negative electrode through the diode and the switch when the switch is closed and when the input end is reversely coupled to the external power supply.

13. The method of claim 12, wherein when the input end is reversely coupled to the external power supply and after outputting the first current to the negative electrode through the diode and the switch, the method further comprises controlling the switch to be opened to decouple the external power supply from the DC/DC conversion circuit.

14. The method of claim 11, wherein the bypass circuit comprises a diode, and wherein the method further comprises:
    identifying, by the controller, that an anode of the diode is coupled to the negative electrode through the switch; and
    determining, by the controller in response to the identifying, that the input end is reversely coupled to the external power supply.

15. A photovoltaic inverter comprising:
    a direct current (DC)/alternating current (AC) inverter circuit comprising:
        a first input end; and
        a first output end;
    a DC/DC conversion circuit coupled to the DC/AC inverter circuit and comprising:
        a second input end configured to couple to an external power supply to receive power to the DC/DC conversion circuit;
        a power circuit;
        a second output end coupled to the first input end;
        a switch disposed between the second input end and the power circuit;
        a bypass circuit coupled between the second input end and the power circuit and disposed between the switch and the power circuit, and wherein the bypass circuit is a unidirectional conduction circuit and is coupled to the power circuit in parallel,
        wherein the switch is configured to be closed when the second input end is reversely coupled to the external power supply, and
        wherein when the switch is closed and when the second input end is reversely coupled to the external power supply, the DC/DC conversion circuit is configured to:
            receive a first current from a positive electrode of the external power supply; and
            output the first current to a negative electrode of the external power supply through the bypass circuit and the switch; and
    a filter circuit coupled to the first output end and configured to filter an alternating current output from the DC/AC inverter circuit.

16. The photovoltaic inverter of claim 15, wherein the DC/DC conversion circuit further comprises a controller coupled to the switch and configured to:
    detect a second current or a voltage at a third output end of the external power supply to determine whether the second input end is reversely coupled to the external power supply; and
    control the switch to be closed when the second input end is reversely coupled to the external power supply.

17. The photovoltaic inverter of claim 15, wherein the DC/DC conversion circuit further comprises a controller coupled to the switch and configured to control the switch to be closed when the second input end is reversely coupled to the external power supply.

18. The photovoltaic inverter of claim 17, wherein the bypass circuit comprises a diode, and wherein the controller is further configured to:
    identify that the second input end is reversely coupled to the external power supply; and
    determine, in response to the identifying, that an anode of the diode is coupled to the positive electrode or the anode is coupled to the positive electrode through the switch.

19. A communications system comprising:
    a communications device; and
    a communications power supply coupled to the communications device and configured to supply power to the communications device, wherein the communications power supply comprises:
        a direct current (DC)/DC conversion circuit comprising:
            an input end configured to couple to an external power supply to receive power to the DC/DC conversion circuit;
            a power circuit;
            an output end;
            a switch disposed between the input end and the power circuit; and
            a bypass circuit coupled between the input end and the power circuit and disposed between the switch and the power circuit, and wherein the bypass circuit is a unidirectional conduction circuit and is coupled to the power circuit in parallel,
            wherein the switch is configured to be closed when the input end is reversely coupled to the external power supply, and
            wherein when the switch is closed and when the input end is reversely coupled to the external power supply, the DC/DC conversion circuit is configured to:
                receive a current from a positive electrode of the external power supply; and
                output the current to a negative electrode of the external power supply through the bypass circuit and the switch.

20. The communications system of claim 19, wherein the bypass circuit comprises a diode, and wherein an anode of the diode is coupled to the positive electrode when the input end is reversely coupled to the external power supply.

* * * * *